US00RE45312E

(19) United States
(12) Reissued Patent
Sumasu et al.

(10) Patent Number: US RE45,312 E
(45) Date of Reissued Patent: Dec. 30, 2014

(54) BASE STATION APPARATUS, COMMUNICATION TERMINAL APPARATUS, AND COMMUNICATION METHOD

(75) Inventors: Atsushi Sumasu, Fukuoka (JP); Osamu Kato, Fukuoka (JP); Mitsuru Uesugi, Kanagawa (JP); Yoshiko Saito, Kanagawa (JP); Toyoki Ue, Kanagawa (JP); Junichi Aizawa, Kanagawa (JP); Keiichi Kitagawa, Kanagawa (JP); Toshiyuki Uehara, Kanagawa (JP); Guizeng Shi, Sendai (JP)

(73) Assignee: Panasonic Intellectual Property Corporation of America, Torrance, CA (US)

(21) Appl. No.: 13/541,515

(22) Filed: Jul. 3, 2012
(Under 37 CFR 1.47)

Related U.S. Patent Documents

Reissue of:
(64) Patent No.: 7,292,862
Issued: Nov. 6, 2007
Appl. No.: 09/958,956
PCT Filed: Feb. 15, 2001
PCT No.: PCT/JP01/01056
§ 371 (c)(1),
(2), (4) Date: Dec. 31, 2001
PCT Pub. No.: WO01/62033
PCT Pub. Date: Aug. 23, 2001

(30) Foreign Application Priority Data

Feb. 16, 2000 (JP) ..... 2000-038877

(51) Int. Cl.
*H04W 72/08* (2009.01)

(52) U.S. Cl.
USPC ..... 455/452.2; 455/450; 370/329; 370/332

(58) Field of Classification Search
CPC ..... H04W 28/04; H04W 72/04; H04W 16/14; H04W 36/04; H04W 36/18
USPC ..... 455/452.2, 561, 450, 452.1, 451, 464, 455/509, 513; 370/332, 328, 329, 330, 353, 370/345, 252; 375/260, 219, 209, 222, 216, 375/232
See application file for complete search history.

(56) References Cited

U.S. PATENT DOCUMENTS 5,726,978 A 3/1998 Frodigh
5,956,642 A * 9/1999 Larsson et al. ..... 455/449
(Continued)

FOREIGN PATENT DOCUMENTS

EP 0913971 6/1999
EP 0913971 A2 * 6/1999
(Continued)

OTHER PUBLICATIONS

International Search Report dated May 29, 2001.
3GPP2, "CDMA 2000 High Rate Packet Data Air Interface Specification," (HDR), Sep. 12, 2000.

*Primary Examiner* — Phuoc H Doan
(74) *Attorney, Agent, or Firm* — Dickinson Wright PLLC

(57) ABSTRACT

An assignment section 101 determines communication resource assignment to communication terminals based on a transmission rate at which communication is possible for each subcarrier of each communication terminal, and instructs a buffer section 102 to output forward transmission data. In addition, the assignment section 101 instructs a frame creation section 103 to perform forward transmission data symbolization, and also outputs a signal indicating communication resource assignment to each communication terminal. The buffer section 102 holds forward transmission data, and outputs forward transmission data to the frame creation section 103 in accordance with instructions from the assignment section 101. The frame creation section 103 symbolizes a resource assignment signal and transmission data to create a frame, which it outputs to a spreading section 104.

8 Claims, 9 Drawing Sheets

(56) References Cited

U.S. PATENT DOCUMENTS

| | | | | |
|---|---|---|---|---|
| 6,094,444 | A * | 7/2000 | Auer | 370/535 |
| 6,282,185 | B1 | 8/2001 | Hakkinen | |
| 6,434,119 | B1 | 8/2002 | Wiese | |
| 6,480,554 | B1 * | 11/2002 | Toskala et al. | 375/340 |
| 6,584,302 | B1 * | 6/2003 | Hottinen et al. | 455/69 |
| 6,587,510 | B1 * | 7/2003 | Minami et al. | 375/285 |
| 7,039,120 | B1 | 5/2006 | Thoumy | |
| 7,133,352 | B1 | 11/2006 | Hadad | |
| 2004/0042387 | A1 * | 3/2004 | Geile | 370/206 |
| 2006/0007883 | A1 * | 1/2006 | Tong et al. | 370/328 |

FOREIGN PATENT DOCUMENTS

| | | |
|---|---|---|
| EP | 0954121 | 11/1999 |
| EP | 0954121 A1 | 11/1999 |
| JP | 09312649 | 12/1997 |
| JP | 10145282 | 5/1998 |
| JP | 10191431 | 7/1998 |
| JP | 11008606 | 1/1999 |
| JP | 11220778 | 8/1999 |

* cited by examiner

BASE STATION APPARATUS, COMMUNICATION TERMINAL APPARATUS, AND COMMUNICATION METHOD

Matter enclosed in heavy brackets [ ] appears in the original patent but forms no part of this reissue specification; matter printed in italics indicates the additions made by reissue.

*This is a broadening continuation reissue application (as opposed to a continuation of a reissue application). The parent reissue is application Ser. No. 12/613,256 filed Nov. 5, 2009 (now U.S. Pat. No. Re. 43,614), which is a reissue application of U.S. Pat. No. 7,292,862 (application Ser. No. 09/958,956) which has a 371 date of Dec. 31, 2001, and which issued on Nov. 6, 2007 and which is a national stage of PCT/JP2001/01056 filed Feb. 15, 2001, which is based on Japanese Application No. 2000-038877 filed Feb. 16, 2000, the entire contents of each of which are incorporated by reference herein.*

TECHNICAL FIELD

The present invention relates to a base station apparatus, communication terminal apparatus, and communication method.

BACKGROUND ART

In a cellular communication system, one base station performs radio communication with a plurality of communication terminals simultaneously, and therefore, as demand has increased in recent years, so has the need for higher transmission efficiency.

One technology for increasing the transmission efficiency of a downlink from a base station to a communication terminal is HDR (High Data Rate). HDR is a method whereby scheduling for assigning communication resources to communication terminals is performed by time division, and data transmission efficiency is further improved by setting the transmission rate for each communication terminal according to the communication quality. This method is suitable for connection via the Internet and the like.

The operations performed by a base station and communication terminals in order to set the transmission rate in HDR will be described below using FIG. 1. In FIG. 1, a base station 11 is currently performing communication with communication terminals 12 to 14.

First, the base station 11 transmits a pilot signal to each of communication terminals 12 to 14. Each of communication terminals 12 to 14 estimates the communication quality according to the SIR (Signal to Interference Ratio) of the received pilot signal, etc., and finds a transmission rate at which communication with the base station is possible. Then, based on the transmission rate at which communication is possible, each of communication terminals 12 to 14 selects a communication mode, which is a combination of packet length, error correction, and modulation method, and transmits a signal indicating the communication mode to the base station 11.

Based on the communication mode selected by each of communication terminals 12 to 14, the base station 11 performs scheduling, sets a transmission rate for each communication terminal, and sends a signal to each of communication terminals 12 to 14 via a control channel indicating communication resource assignment to each communication terminal.

The base station 11 then transmits only data for the relevant communication terminal in its assigned time. For example, if time t1 has been assigned to communication terminal 12, the base station 11 transmits data for communication terminal 12 in time t1, and does not transmit to communication terminals 13 and 14.

In this way, data transmission efficiency has conventionally been increased for the overall system by setting a transmission rate for each communication terminal according to the communication quality by means of HDR.

Here, the communication quality of some bands may degrade due to frequency selective fading. Also, the band portion for which communication quality degrades differs for each communication terminal.

In FIG. 2, for example, communication terminal 12 has good communication quality on the high-frequency side but poor communication quality on the low-frequency side, while communication terminal 13 has good communication quality on the low-frequency side but poor communication quality on the high-frequency side, and communication terminal 14 also has good communication quality on the low-frequency side but poor communication quality on the high-frequency side.

However, as the above-described conventional base station and communication terminals perform communication using the entire band, a problem is that communication quality degrades and transmission efficiency falls in a band affected by frequency selective fading.

DISCLOSURE OF THE INVENTION

It is an objective of the present invention to provide a base station apparatus, communication terminal apparatus, and communication method that enable high transmission efficiency to be maintained even in an environment affected by frequency selective fading.

This objective is achieved by estimating the communication quality for each subcarrier in each communication terminal, and transmitting data from the base station to each communication terminal using a subcarrier for which the communication quality is good.

BEST MODE FOR CARRYING OUT THE INVENTION

With reference now to the attached drawings, embodiments of the present invention will be explained in detail below.

(Embodiment 1)

Figure 1:
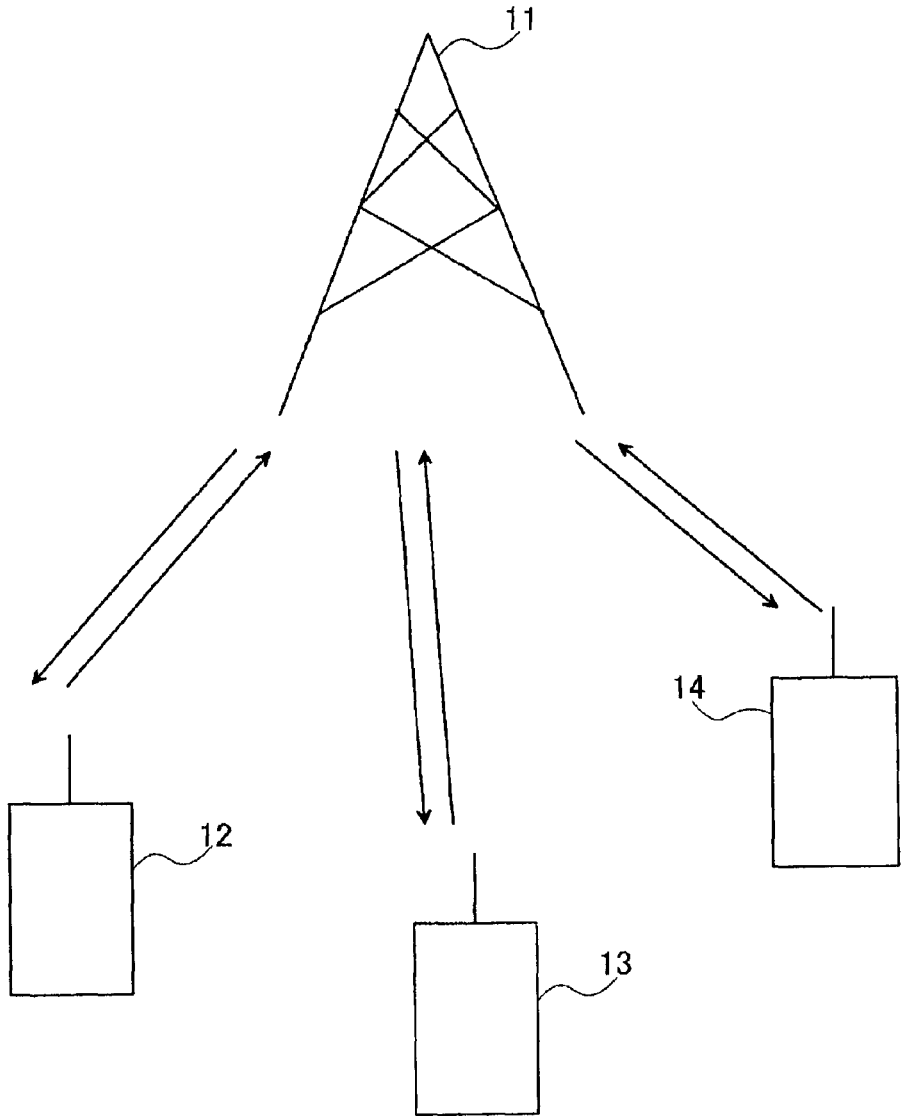
FIG. 1 is drawing showing a communication mode using the conventional HDR method.
Figure 2:
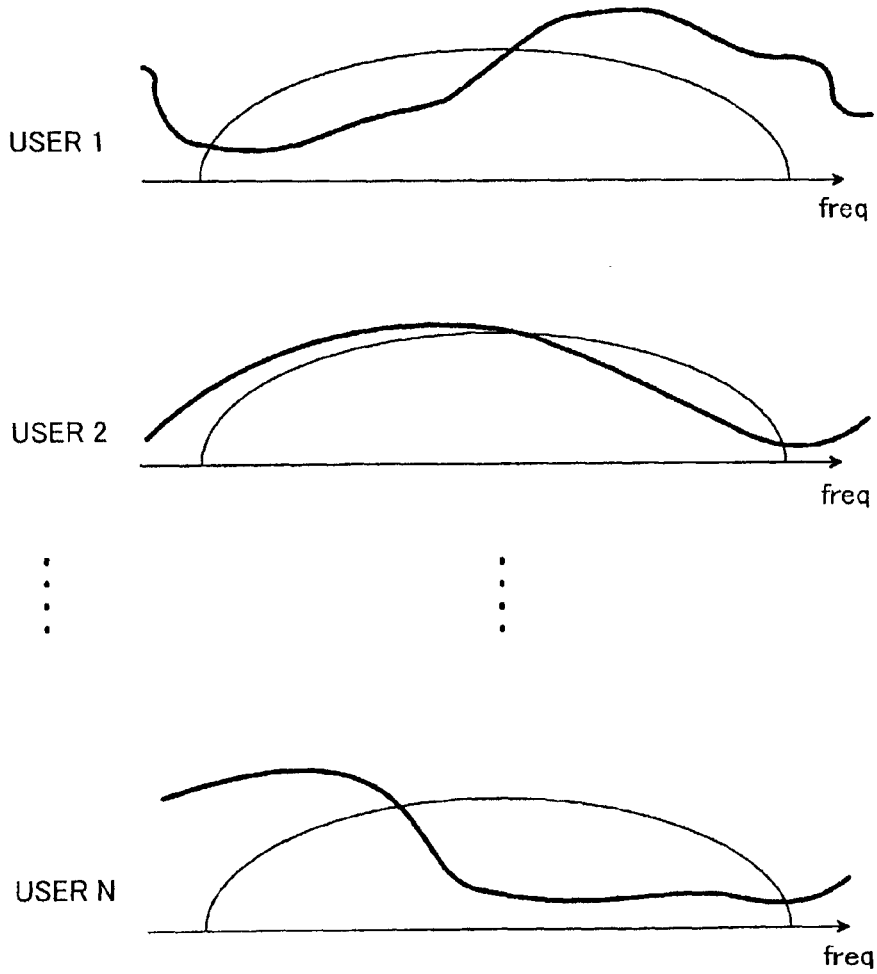
FIG. 2 is a drawing showing the effects of frequency selective fading in a communication band.
Figure 3:
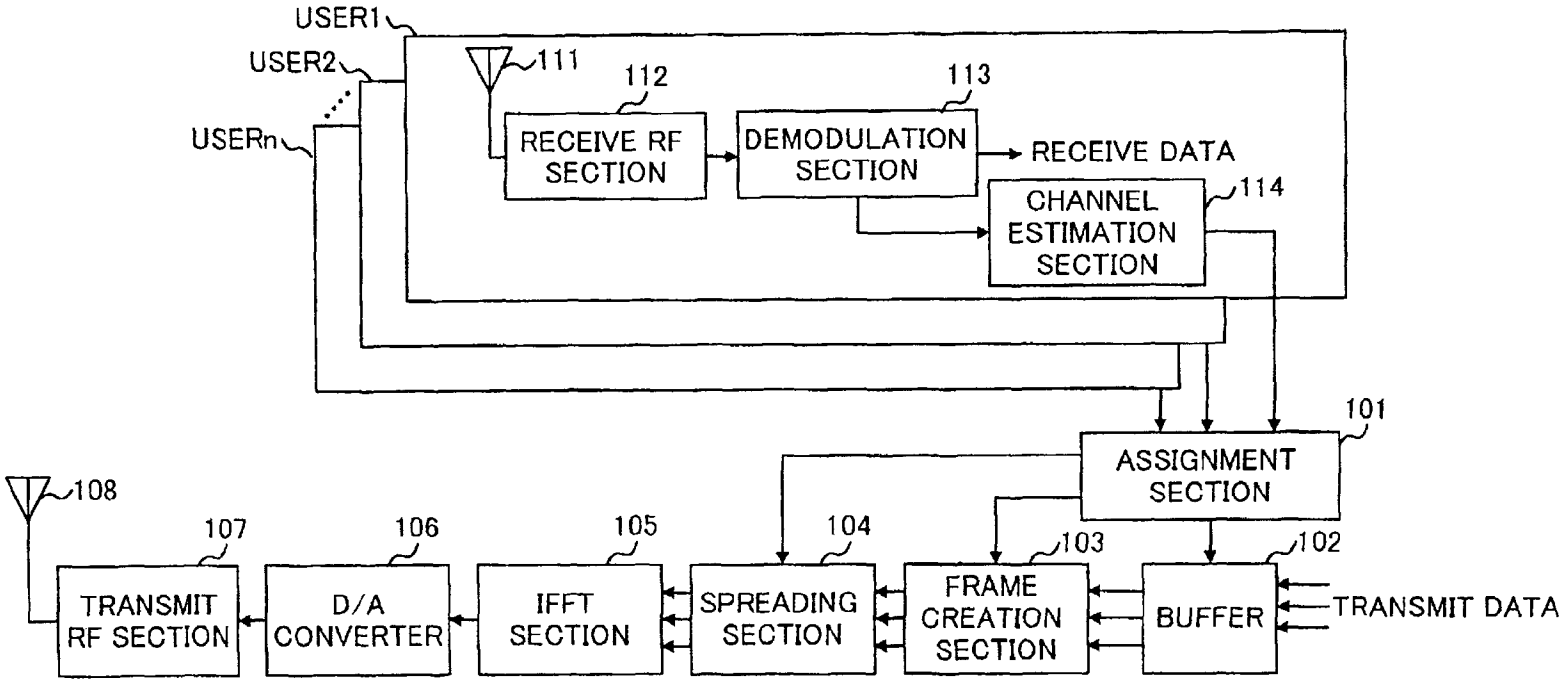
FIG. 3 is a block diagram showing the configuration of a base station according to Embodiment 1 of the present invention.

FIG. 3 is a block diagram showing the configuration of a base station according to Embodiment 1 of the present invention.

In FIG. 3, an assignment section 101 determines communication resource assignment to each communication terminal based on a transmission rate at which communication is possible for each subcarrier of each communication terminal estimated by a channel estimation section 114 to be described below, and gives instructions to a buffer section 102 for forward transmission data output. The assignment section 101 also instructs a frame creation section 103 to perform forward transmission data symbolization, and outputs a signal indicating communication resource assignment to each communication terminal (hereinafter referred to as "resource assignment signal"). In addition, the assignment section 101 indicates to a spreading section 104 a spreading code to be multiplied by the forward transmission data.

The buffer section 102 holds forward transmission data, and outputs forward transmission data to the frame creation section 103 in accordance with instructions from the assignment section 101.

The frame creation section 103 generates a pilot signal, symbolizes forward transmission data output from the buffer section 102 in accordance with instructions from the assignment section 101, and inserts a pilot signal at predetermined intervals to create a frame, which it outputs to the spreading section 104. The frame creation section 103 also symbolizes the resource assignment signal and transmission data to create a frame, which it outputs to the spreading section 104.

At the start of communication, the frame creation section 103 outputs only a pilot signal to the spreading section 104.

The spreading section 104 spreads frame creation section 103 output signals in accordance with instructions of the assignment section 101, and outputs them to an IFFT section 105.

The IFFT section 105 performs an inverse fast Fourier transform of the spreading section 104 output signals, and outputs the resulting signal to a D/A converter 106. The D/A converter 106 performs digital-to-analog conversion of the IFFT section 105 output signal, and outputs the resulting signal to a transmit RF section 107. The transmit RF section 107 converts the frequency of the D/A converter 106 output signal to a radio frequency, and outputs this signal to an antenna 108. The antenna 108 transmits the transmit RF section 107 output signal to a communication terminal.

Antenna 111 receives a signal transmitted by radio from a communication terminal and outputs it to a receive RF section 112. The receive RF section 112 converts the received signal frequency to baseband and outputs it to a demodulation section 113.

The demodulation section 113 demodulates the baseband signal and outputs received data. In addition, the demodulation section 113 outputs a data rate request (hereinafter referred to as "DRR") signal included in the baseband signal to the channel estimation section 114. The DRR signal will be explained later together with a description of the communication terminal configuration.

Based on the DRR signal, the channel estimation section 114 estimates a transmission rate at which communication with each communication terminal is possible for each subcarrier, and outputs the estimation results to the assignment section 101.

A receive RF section 112, demodulation section 113, and channel estimation section 114 are provided for each user.

Figure 4:
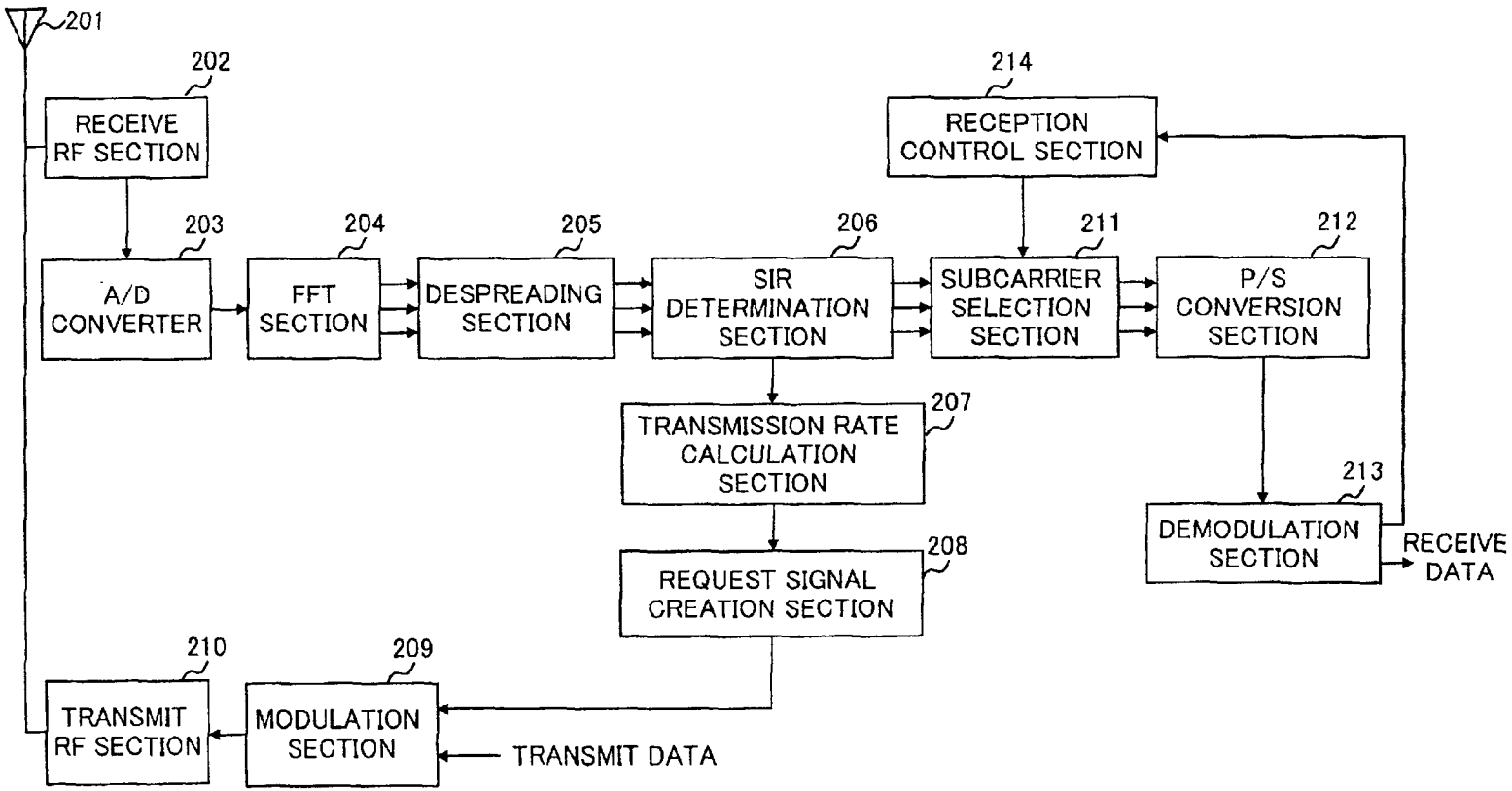
FIG. 4 is a block diagram showing the configuration of a communication terminal according to the above-mentioned embodiment.

FIG. 4 is a block diagram showing the configuration of a communication terminal according to this embodiment.

In FIG. 4, an antenna 201 receives a radio signal transmitted from the base station shown in FIG. 3, and outputs it to a receive RF section 202. In addition, the antenna 201 transmits a transmit signal output from a transmit RF section 210 to the base station shown in FIG. 3 as a radio signal.

The receive RF section 202 converts the frequency of a radio frequency signal received by the antenna 201 to baseband, and outputs it to an A/D converter 203. The A/D converter 203 performs analog-to-digital conversion of the baseband signal and outputs it to an FFT section 204. The FFT section 204 performs a fast Fourier transform of the A/D converter 203 output signal and outputs the results to a despreading section 205. The despreading section 205 despreads the FFT section 204 output signals and outputs the resulting signals to an SIR determination section 206.

The SIR determination section 206 extracts a pilot signal from the despreading section 205 output signals, and outputs components other than the pilot signal to a subcarrier selection section 211. In addition, the SIR determination section 206 finds the SIR for each subcarrier based on the extracted pilot signal, and outputs it to a transmission rate calculation section 207.

The transmission rate calculation section 207 calculates a possible transmission rate with respect to the base station for each subcarrier based on the SIR, and outputs the calculation results to a request signal creation section 208.

Based on the calculation results of the transmission rate calculation section 207, the request signal creation section 208 creates a DRR signal for requesting the subcarrier transmission rate of each subcarrier from the base station, which it outputs to a modulation section 209. The modulation section 209 modulates the DRR signal and inbound transmission data, and outputs the result to the transmit RF section 210.

The transmit RF section 210 performs frequency conversion of the modulation section 209 output signal to radio frequency, and outputs this signal to the antenna 201.

In accordance with notification from a reception control section 214, the subcarrier selection section 211 selects components other than the pilot signal output from the SIR determination section 206 in each subcarrier, and outputs these to a P/S conversion section 212.

The P/S conversion section 212 performs parallel-to-serial conversion of the output signals from the subcarrier selection section 211 and outputs the resulting signal to a demodulation section 213.

The demodulation section 213 demodulates the output signal from the P/S conversion section 212 to extract received data, and also outputs a control signal to the reception control section 214.

Based on the control signal, the reception control section 214 reports the subcarrier by which a signal addressed to this station is carried to the subcarrier selection section 211.

Next, the signal flow until determination of the downlink transmission rate between the base station shown in FIG. 3 and the communication terminal shown in FIG. 4 will be described.

First, a pilot signal is created in the frame creation section 103 of the base station. The pilot signal is spread by the spreading section 104 together with forward transmission data, undergoes an inverse fast Fourier transform by the IFFT section 105, digital-to-analog conversion by the D/A converter 106, and frequency conversion to a radio frequency by the transmit RF section 107, and is transmitted to the communication terminal from the antenna 108.

In the communication terminal, a signal received by the antenna 201 undergoes frequency conversion to baseband by the receive RF section 202, analog-to-digital conversion by the A/D converter 203, and a fast Fourier transform by the FFT section 204, and is despread by the despreading section 205. The pilot signal is then extracted from the despreading section 205 by the SIR determination section 206, and the SIR is found based on the pilot signal.

Then the transmission rate calculation section 207 calculates a transmission rate at which communication is possible for each subcarrier based on the SIR, and the request signal creation section 208 creates a DRR signal for requesting the transmission rate of each subcarrier.

The DRR signal is modulated by the modulation section 209 together with inbound transmission data, undergoes frequency conversion to a radio frequency by the transmit RF section 210, and is transmitted to the base station from the antenna 201.

In the base station, a signal received by the antenna 111 undergoes frequency conversion to baseband by the receive RF section 112 and is demodulated by the demodulation section 113, and the DRR signal included in the demodulated baseband signal is output to the channel estimation section 114. Based on the DRR signal, the channel estimation section 114 estimates for each subcarrier a transmission rate at which communication with each terminal is possible.

Based on the transmission rate at which communication is possible for each subcarrier of each communication terminal, the assignment section 101 determines communication resource assignment to each communication terminal, and outputs a resource assignment signal to the frame creation section 103.

The resource assignment signal is despread by the spreading section 104 together with forward transmission data, undergoes an inverse fast Fourier transform by the IFFT section 105, digital-to-analog conversion by the D/A converter 106, and frequency conversion to a radio frequency by the transmit RF section 107, and is sent to each communication terminal from the antenna 108 via a control channel.

Based on the resource assignment signal, each communication terminal receives data in the reception time and on the subcarrier assigned to it.

Outbound transmission data to be sent to communication terminals from the base station is stored in the buffer section 102 until communication resource assignment has been decided. After a resource assignment signal has been transmitted, forward transmission data is output from the buffer section 102 to the frame creation section 103 in accordance with the resource assignment signal, and symbolized.

When forward transmission data is symbolized, the subcarrier and communication rate are set based on the resource assignment signal.

Symbolized forward transmission data undergoes an inverse fast Fourier transform by the IFFT section 105, digital-to-analog conversion by the D/A converter 106, and frequency conversion to a radio frequency by the transmit RF section 107, and is transmitted from the antenna 108.

Next, an actual example of communication resource assignment will be described.

Figure 5:
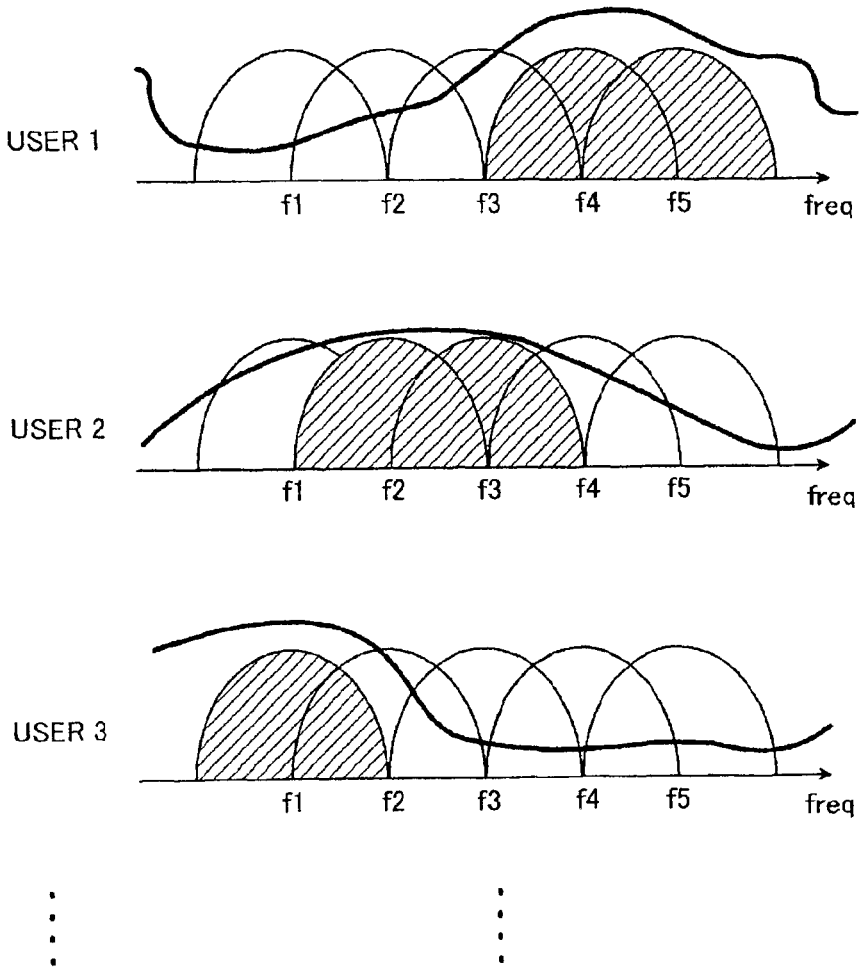
FIG. 5 is a drawing showing the effects of frequency selective fading and band assignment in communication between a base station and communication terminals according to the above-mentioned embodiment.

FIG. 5 is a drawing showing the effects of frequency selective fading and band assignment in communication between a base station and communication terminals.

The bold lines in FIG. 5 show the effect of fading on band communication quality.

The user 1 communication terminal has good communication quality in bands f4 and f5 but poor communication quality in bands f1, f2, and f3. The user 2 communication terminal has good communication quality in bands f2 and f3 but poor communication quality in bands f1, f4, and f5. And the user 3 communication terminal has good communication quality in band f1 but poor communication quality in bands f2, f3, f4, and f5.

Thus, in communication with the respective communication terminals, bands with good communication quality are assigned.

Figure 6:
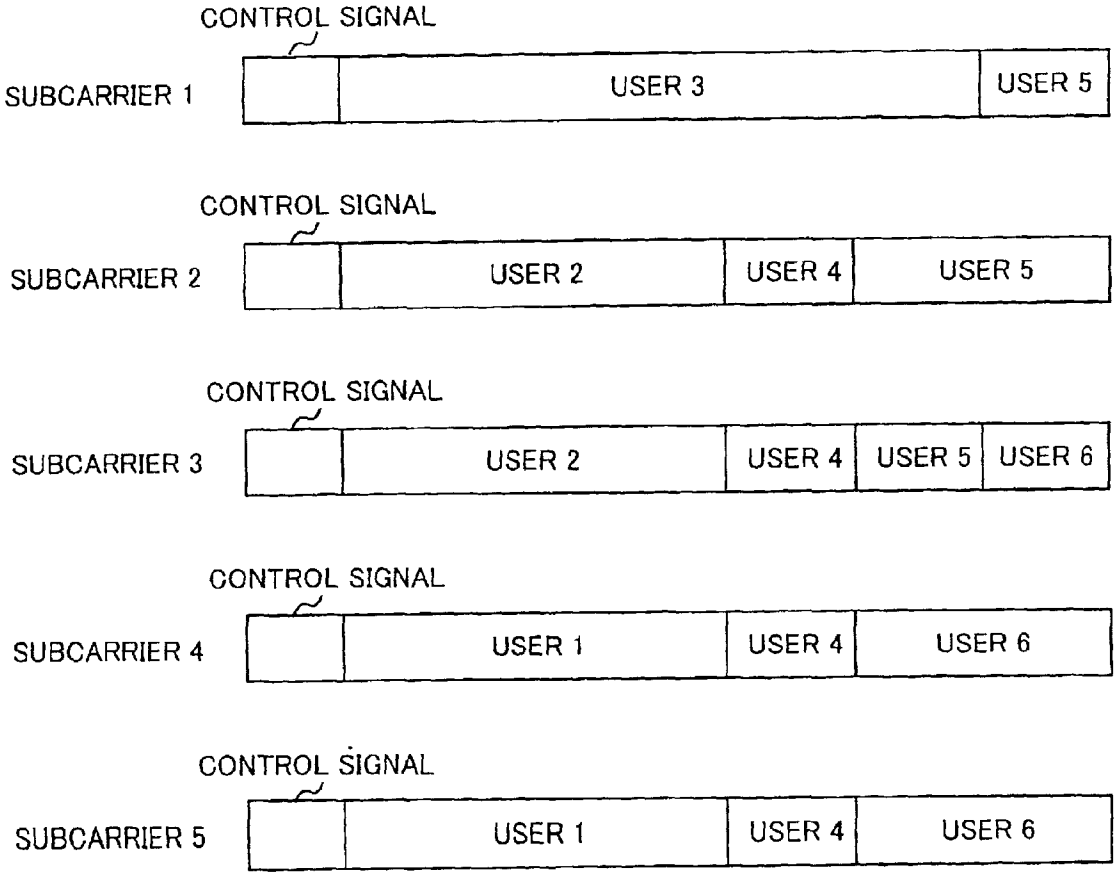
FIG. 6 is a drawing showing an example of resource assignment in slots for transmission from a base station to communication terminals according to the above-mentioned embodiment.

FIG. 6 is a drawing showing an example of resource assignment in slots for transmission from a base station to communication terminals. The horizontal axis shows times at which slot transmission is performed.

In data transmission from the base station, control signals and data are included in a slot of a predetermined length. The control signals include signals that indicate the data transmission timing and transmission rate to each user communication terminal, and data is arranged according to the control signal information.

In FIG. 6, subcarrier 1 uses band f1, subcarrier 2 uses band f2, subcarrier 3 uses band f3, subcarrier 4 uses band f4, and subcarrier 5 uses band f5.

The base station assigns band f1 to communication with the user 3 communication terminal, assigns bands f2 and f3 to communication with the user 2 communication terminal, and assigns bands f4 and f5 to communication with the user 3 communication terminal.

User 3 data is assigned to the subcarrier 1 time slot, user 2 data is assigned to the subcarrier 2 time slot, user 2 data is assigned to the subcarrier 3 time slot, user 1 data is assigned to the subcarrier 4 time slot, and user 1 data is assigned to the subcarrier 5 time slot.

Thereafter, bands with good communication quality are also assigned to users 4, 5, and 6.

By estimating the communication quality for each subcarrier in each communication terminal and transmitting data from the base station to each communication terminal using a subcarrier with good communication quality in this way, it is possible to maintain high transmission efficiency even in an environment subject to frequency selective fading. Also, by receiving data on each subcarrier, it is possible to maintain high transmission efficiency even in an environment subject to frequency selective fading.

A resource assignment signal can be transmitted using a different frequency or different modulation method from a data signal.

Also, a resource assignment signal can be transmitted for each subcarrier, as subcarrier-unit resource assignment information. In this case, resource assignment signals can be simplified by having the base station create resource assignment signals in each subcarrier and transmit them using the same subcarrier as the data, and having communication terminals received data in each subcarrier based on a received communication resource assignment signal.

In this embodiment, a station's own address symbol is extracted from post-despreading symbols output from the SIR determination section 206, but with the present invention, a station's own address symbol can be extracted as long as it is a symbol after a fast Fourier transform and before demodulation.

In this case, in FIG. 3, a symbol is output from the FFT section 204, despreading section 205, or P/S conversion section 212 to the subcarrier selection section 211.

(Embodiment 2)

Figure 7:
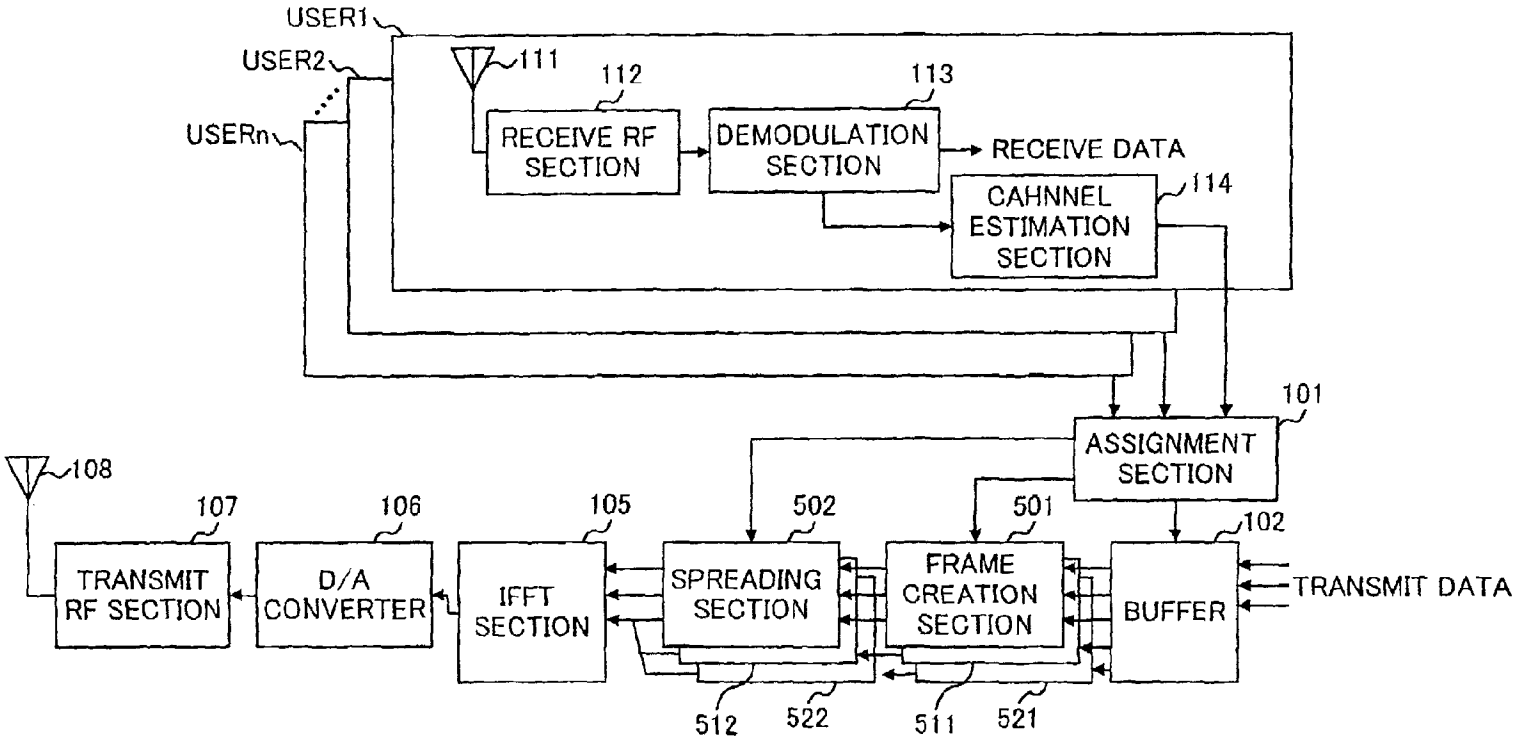
FIG. 7 is a block diagram showing the configuration of a base station according to Embodiment 2 of the present invention.

FIG. 7 is a block diagram showing the configuration of a base station according to Embodiment 2 of the present invention.

Parts identical to those in FIG. 3 are assigned the same reference numerals as in FIG. 3 and their detailed explanations are omitted.

The base station apparatus in FIG. 7 comprises a plurality of spreading sections 502, 512, 522, and a plurality of frame creation sections 501, 511, 521, and differs from the base station in FIG. 3 in that a signal with a low spreading ratio is transmitted in a band with good communication quality, and a signal with a high spreading ratio is transmitted in a band with poor communication quality due to the effects of frequency selective fading, etc.

In FIG. 7, an assignment section 101 determines communication resource assignment to each communication terminal based on a transmission rate at which communication is possible for each subcarrier of each communication terminal estimated by a channel estimation section 114, and gives instructions to a buffer section 102 for forward transmission data output. The assignment section 101 also instructs frame creation sections 501, 511, 521 to perform forward transmission data symbolization, and outputs a resource assignment signal. In addition, the assignment section 101 indicates to spreading sections 502, 512, 522 respectively a spreading code to be multiplied by the forward transmission data.

Frame creation sections 501, 511, 521 generate a pilot signal, symbolize forward transmission data output from the buffer section 102 in accordance with instructions from the assignment section 101, and insert a pilot signal at predetermined intervals to create a frame, which they output to spreading sections 502, 512, 522. At the start of communication, frame creation sections 501, 511, 521 output only a pilot signal to spreading sections 502, 512, 522.

Spreading sections 502, 512, 522 spread the frame creation section 501, 511, 521 output signals using the respective spreading codes indicated by the assignment section 101, and output them to an IFFT section 105.

By having spreading sections 502, 512, 522 perform spreading individually using spreading codes indicated by the assignment section 101 in this way, it is possible to transmit symbols with a spreading ratio set for individual communication terminals for the respective subcarriers.

Figure 8:
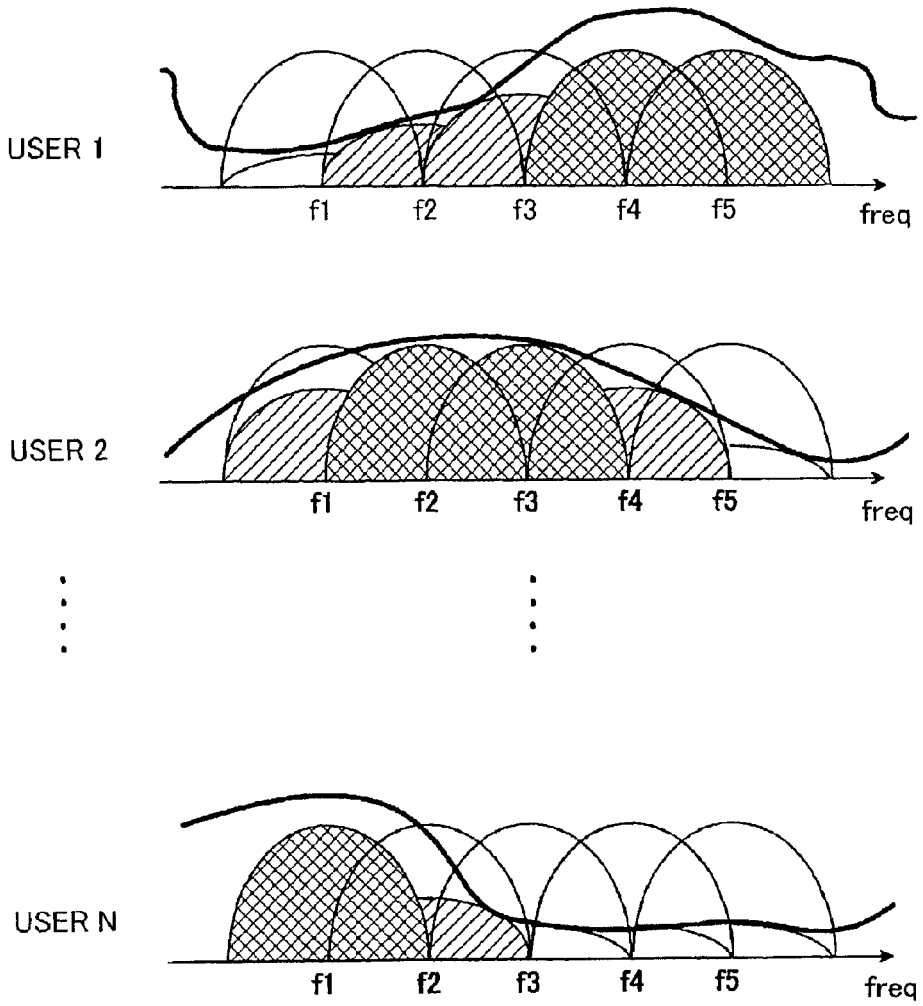
FIG. 8 is a drawing showing communication resource assignment according to the above-mentioned embodiment.

Next, communication resource assignment will be described. FIG. 8 is a drawing showing communication resource assignment according to Embodiment 2.

In FIG. 8, the horizontal axis shows frequencies and the vertical axis shows communication quality. The bold lines show variations in communication quality due to frequency selective fading in communication with each communication terminal.

The user 1 communication terminal has good communication quality in bands f4 and f5, rather poor communication quality in bands f2 and f3, and poor communication quality in band f1. The user 2 communication terminal has good communication quality in bands f2 and f3, rather poor communication quality in bands f1 and f4, and poor communication quality in band f5.

Thus, the base station transmits signals with a low spreading ratio to the user 1 communication terminal in bands f4 and f5, and transmits signals with a high spreading ratio in lower-frequency bands f2 and f3.

Also, the base station transmits signals with a low spreading ratio to the user 1 communication terminal in bands f2 and f3, and transmits signals with a high spreading ratio in lower-frequency bands f1 and f4.

In this way, a communication apparatus of the present invention, by transmitting signals with a low spreading ratio in bands with good communication quality, and transmitting signals with a high spreading ratio in bands with poor communication quality due to the effects of frequency selective fading, etc., can transmission data at a high transmission rate by transmitting signals with a low spreading ratio in bands with good communication quality.

Also, by transmitting a signal with a high spreading ratio in a band with poor communication quality, it is possible to reduce the influence on other signals spread on the same subcarrier.

(Embodiment 3)

Figure 9:
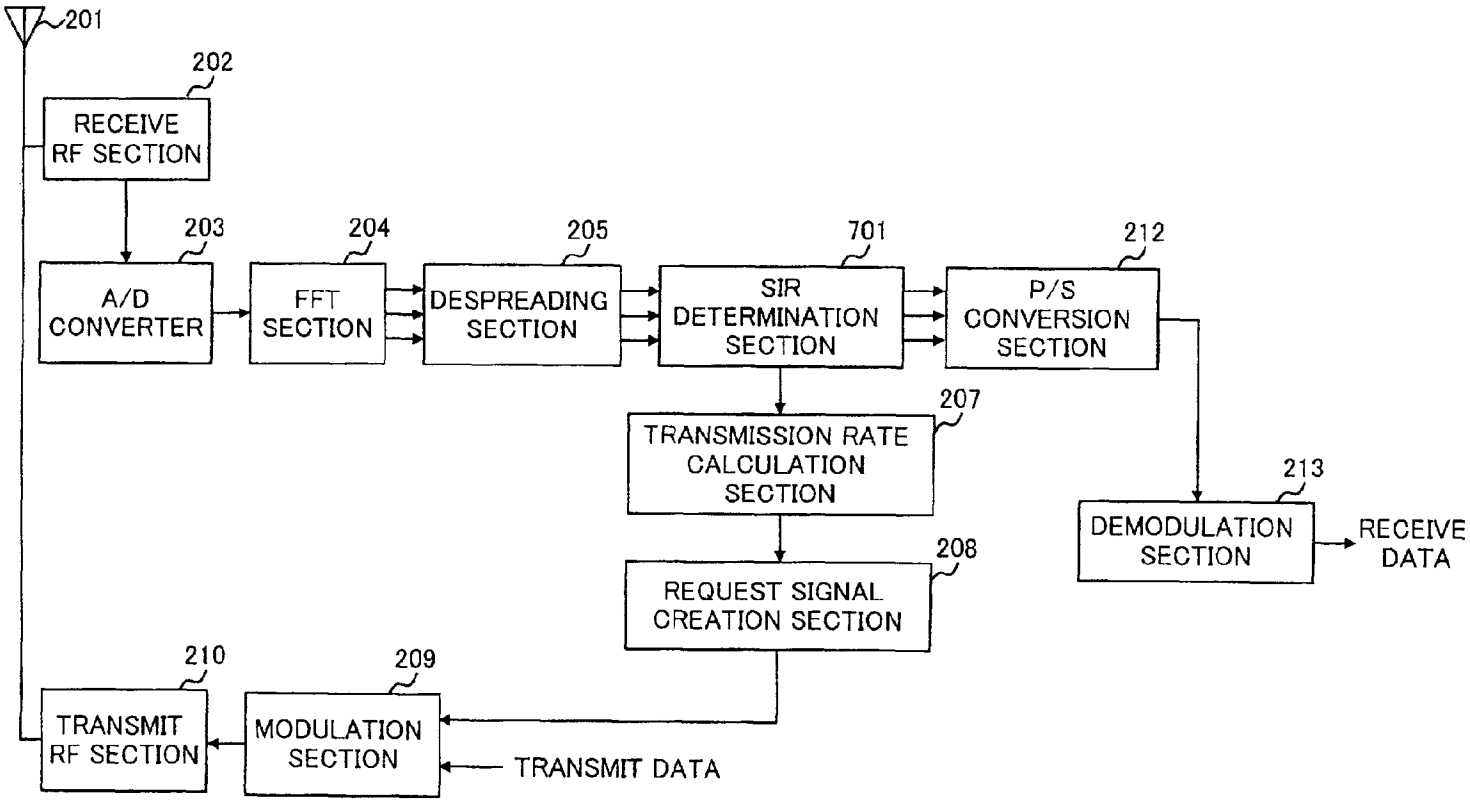
FIG. 9 is a block diagram showing the configuration of a communication terminal according to Embodiment 3 of the present invention.

FIG. 9 is a block diagram showing the configuration of a communication terminal according to Embodiment 3 of the present invention. Parts identical to those in FIG. 4 are assigned the same reference numerals as in FIG. 4 and their detailed explanations are omitted.

In FIG. 9, an SIR determination section 701 finds the ratio of the interference component to a signal in another band based on a received pilot signal, and outputs the result to a transmission rate calculation section 207 as an SIR.

In addition, the SIR determination section 701 determines a signal that meets a predetermined threshold value from among received signals to be a signal for communication with that station and outputs it to a P/S conversion section 212, and discards signals that do not meet the predetermined threshold value as interference signals.

By estimating communication quality for each subcarrier in each communication terminal and transmitting data from the base station to each communication terminal using a subcarrier with good communication quality in this way, it is possible to maintain high transmission efficiency even in an environment subject to frequency selective fading. Also, by receiving data on each subcarrier, it is possible to maintain high transmission efficiency even in an environment subject to frequency selective fading.

In the embodiments of the present invention, a transmission rate at which communication with the base station is possible is calculated based on an SIR, but this is not a limitation, and a value that indicates the quality of a communication line, such as signal-to-noise ratio, may also be used as a basis for calculating a transmission rate.

Also, in the embodiments of the present invention, despreading processing is carried out on symbols after a fast Fourier transform, but this is not a limitation, and it is also possible for a fast Fourier transform to be carried out on symbols after subcarrier selection or after parallel-to-serial conversion.

Moreover, the present invention can be applied to any communication method as long as it uses frequency division.

As can be seen from the above descriptions, it is possible to estimate the communication quality for each subcarrier in each communication terminal, and to transmission data from a base station to each communication terminal using a subcarrier for which the communication quality is good.

This application is based on the Japanese Patent Application No. 2000-038877 filed on Feb. 16, 2000, entire content of which is expressly incorporated by reference herein.

The invention claimed is:

[1. A base station apparatus comprising:

a receiver that receives a signal representing communication quality estimated per subcarrier in a communication terminal apparatus of a communicating party;

an assigner that assigns subcarriers for use in communication with the communication terminal apparatus in accordance with the signal representing communication quality; and a transmitter that transmits data to the communication terminal apparatus using the subcarriers assigned by the assigner.]

[2. The base station apparatus of claim 1 wherein the transmitter transmits subcarrier assignment information per subcarrier.]

[3. The base station apparatus of claim 1, wherein the assigner assigns the subcarriers, for use in communication with the communication terminal apparatus, per time slot.]

[4. The base station apparatus of claim 1, wherein the assigner determines a spreading factor, of the data transmitted from the transmitter, in accordance with the signal representing communication quality.]

[5. A communication terminal apparatus comprising a demodulator that demodulates a signal, addressed to said communication terminal apparatus and carried by subcarriers, in accordance with the subcarrier assignment information transmitted from the base station apparatus of claim 2.]

[6. The communication terminal apparatus of claim 5, wherein the demodulator performs threshold determination of quality of the signal addressed to said communication terminal apparatus and demodulates said signal when the quality is above a predetermined threshold.]

[7. A communication method comprising:

receiving a signal at a base station apparatus, said signal representing communication quality estimated per subcarrier in a communication terminal apparatus of a communicating party;

assigning subcarriers for use in communication with the communication terminal apparatus in accordance with the signal representing communication quality;

transmitting subcarrier assignment information and data to the communication terminal apparatus using the assigned subcarriers; and demodulating a signal addressed to the communication terminal apparatus and carried by the subcarriers, in accordance with the subcarrier assignment information transmitted from the base station apparatus.]

[8. A communication method comprising:

receiving a signal at a base station apparatus, said signal representing communication quality estimated per subcarrier in a communication terminal apparatus of a communicating party;

assigning subcarriers for use in communication with the communication terminal apparatus in accordance with the signal representing communication quality;

transmitting data to the communication terminal apparatus using the assigned subcarriers; and performing threshold determination of quality of a signal addressed to the communication terminal apparatus and demodulating said signal when the quality is above a predetermined threshold.]

*9. A communication method comprising:*

*receiving, at a base station apparatus, a signal transmitted from a terminal apparatus, the signal indicating communication quality calculated in said terminal apparatus for each of bands, into which a frequency domain comprised of subcarriers is divided, and each of the bands comprising a subcarrier;*

*assigning, to said terminal apparatus, a resource comprised of consecutive subcarriers in a part of the bands;*

*transmitting, from said base station apparatus to said terminal apparatus, assignment information indicating the resource assigned to said terminal apparatus; and*

*transmitting, from said base station apparatus to said terminal apparatus, data using the resource,*

*wherein the assignment information is transmitted using another resource which is different from the resource assigned to said terminal apparatus.*

*10. A communication method comprising:*

*receiving, at a base station apparatus, a signal transmitted from a terminal apparatus, the signal indicating communication quality calculated in said terminal apparatus for each of bands, into which a frequency domain comprised of subcarriers is divided, and each of the bands comprising a subcarrier;*

*assigning, to said terminal apparatus, a resource comprised of consecutive subcarriers in a part of the bands;*

*transmitting, from said base station apparatus to said terminal apparatus, assignment information indicating the resource assigned to said terminal apparatus; and*

*transmitting, from said base station apparatus to said terminal apparatus, data using the resource,*

*wherein the assignment information is transmitted with a modulation scheme which is different from that for the data.*

*11. A communication method comprising:*

*transmitting, from a terminal apparatus to a base station apparatus, a signal indicating communication quality calculated for each of bands, into which a frequency domain comprised of subcarriers is divided, and each of the bands comprising a subcarrier;*

*receiving, at said terminal apparatus, assignment information, which indicates a resource assigned to said terminal apparatus and which is transmitted from said base station apparatus to said terminal apparatus, the resource being comprised of consecutive subcarriers in a part of the bands; and*

*receiving, at said terminal apparatus, data transmitted from said base station apparatus using the resource, which said base station apparatus assigns to said terminal apparatus, in accordance with the assignment information,*

*wherein the assignment information is transmitted using another resource which is different from the resource assigned to said terminal apparatus.*

*12. A communication method comprising:*

*transmitting, from a terminal apparatus to a base station apparatus, a signal indicating communication quality calculated for each of bands, into which a frequency domain comprised of subcarriers is divided, and each of the bands comprising a subcarrier;*

*receiving, at said terminal apparatus, assignment information, which indicates a resource assigned to said terminal apparatus and which is transmitted from said base station apparatus to said terminal apparatus, the resource being comprised of consecutive subcarriers in a part of the bands; and*

*receiving, at said terminal apparatus, data transmitted from said base station apparatus using the resource, which said base station apparatus assigns to said terminal apparatus, in accordance with the assignment information,*

*wherein the assignment information is transmitted with a modulation scheme which is different from that for the data.*

*13. A base station apparatus comprising:*

*a receiver configured to receive a signal transmitted from a terminal apparatus, the signal indicating communication quality calculated in said terminal apparatus for each of bands, into which a frequency domain comprised of subcarriers is divided, and each of the bands comprises a subcarrier;*

*an assigner configured to assign, to said terminal apparatus, a resource comprised of consecutive subcarriers in a part of the bands;*

*a transmitter configured to transmit, to said terminal apparatus, assignment information indicating the resource assigned to said terminal apparatus, and configured to transmit, to said terminal apparatus, data using the resource,*

*wherein the assignment information is transmitted using another resource which is different from the resource assigned to said terminal apparatus.*

*14. A base station apparatus comprising:*

*a receiver configured to receive a signal transmitted from a terminal apparatus, the signal indicating communication quality calculated in said terminal apparatus for each of bands, into which a frequency domain comprised of subcarriers is divided, and each of the bands comprises a subcarrier;*

*an assigner configured to assign, to said terminal apparatus, a resource comprised of consecutive subcarriers in a part of the bands;*

*a transmitter configured to transmit, to said terminal apparatus, assignment information indicating the resource assigned to said terminal apparatus, and configured to transmit, to said terminal apparatus, data using the resource,*

*wherein the assignment information is transmitted with a modulation scheme which is different from that for the data.*

*15. A terminal apparatus comprising:*

*a transmitter configured to transmit, to a base station apparatus, a signal indicating communication quality calculated for each of bands, into which a frequency domain comprised of subcarriers is divided, and each of the bands comprises a subcarrier; and*

*a receiver configured to receive assignment information, which indicates a resource assigned to said terminal apparatus and which is transmitted from said base station apparatus, the resource being comprised of consecutive subcarriers in a part of the bands, and configured to receive data transmitted from said base station apparatus using the resource, which said base station apparatus assigns to said terminal apparatus, in accordance with the assignment information,*

*wherein the assignment information is transmitted using another resource which is different from the resource assigned to said terminal apparatus.*

*16. A terminal apparatus comprising:*

*a transmitter configured to transmit, to a base station apparatus, a signal indicating communication quality calculated for each of bands, into which a frequency domain comprised of subcarriers is divided, and each of the bands comprises a subcarrier; and*

*a receiver configured to receive assignment information, which indicates a resource assigned to said terminal apparatus and which is transmitted from said base station apparatus, the resource being comprised of consecutive subcarriers in a part of the bands, and configured to receive data transmitted from said base station apparatus using the resource, which said base station apparatus assigns to said terminal apparatus, in accordance with the assignment information,*

*wherein the assignment information is transmitted with a modulation scheme which is different from that for the data.*

* * * * *